(12) United States Patent
Talukdar et al.

(10) Patent No.: US 10,466,661 B2
(45) Date of Patent: Nov. 5, 2019

(54) MODEL-BASED PERFORMANCE ESTIMATION

(71) Applicant: General Electric Company, Schenectady, NY (US)

(72) Inventors: Atanu Talukdar, Bangalore (IN); Venkatesh Kattigari Madyastha, Bangalore (IN); Guruprasad Srinivasan, Bangalore (IN); Kotesh Kummamuri Rao, Houston, TX (US); Jose Leon Vega, Queretaro (MX); Jose Mendoza, Queretaro (MX); Hardev Singh, West Chester, OH (US); Yan Chen, West Chester, OH (US); Johan Michael Reimann, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 15/380,781

(22) Filed: Dec. 15, 2016

(65) Prior Publication Data

US 2017/0175567 A1    Jun. 22, 2017

(51) Int. Cl.
*G05B 13/04*    (2006.01)
*F02C 9/28*    (2006.01)

(52) U.S. Cl.
CPC ............. *G05B 13/041* (2013.01); *F02C 9/28* (2013.01); *F05D 2260/81* (2013.01); *F05D 2270/54* (2013.01); *F05D 2270/71* (2013.01)

(58) Field of Classification Search
CPC .... F02C 9/28; F05D 2260/81; F05D 2270/44; F05D 2270/54; F05D 2270/71; G05B 13/041
See application file for complete search history.

(56) References Cited

U.S. PATENT DOCUMENTS 5,464,369 A * 11/1995 Federspiel ............... F24F 11/30
454/256
6,532,412 B2    3/2003 Adibhatla et al.
(Continued)

OTHER PUBLICATIONS

Joachim Kurzke, "Model Based Gas Turbine Parameter Corrections", ASME Turbo Expo 2003, collocated with the 2003 International Joint Power Generation Conference, vol. 1, pp. 91-99; 9 pages, Jun. 16-19, 2003.
(Continued)

*Primary Examiner* — Michael J Huntley
(74) *Attorney, Agent, or Firm* — Dale Davis; Hoffman Warnick LLC (57) ABSTRACT

A controller includes a processor and memory. The memory stores instructions that, when executed, are configured to cause the processor to receive measurements pertaining to a measured operation parameter of at least a portion of a turbine system. The instructions are also configured to cause the processor to generate a customized model for the at least the portion of the turbine system. Moreover, the instructions are configured to cause the processor to estimate an estimated value using the received measurements. The estimated value pertains to a parameter of the turbine system. Furthermore, the instructions are configured to cause the processor to using the customized model, reduce or remove at least some environmental conditions from a corrected estimated value derived from the estimated value.

12 Claims, 7 Drawing Sheets

(56) References Cited

U.S. PATENT DOCUMENTS

| | | | |
|---|---|---|---|
| 7,742,904 B2 | 6/2010 | Healy et al. | |
| 7,822,512 B2 | 10/2010 | Thatcher et al. | |
| 7,853,392 B2 | 12/2010 | Healey et al. | |
| 8,423,161 B2 | 4/2013 | Wilkes et al. | |
| 2004/0024559 A1* | 2/2004 | Down | G01D 18/008 702/127 |
| 2004/0102890 A1* | 5/2004 | Brunell | G05B 13/048 701/100 |
| 2007/0073525 A1* | 3/2007 | Healy | G05B 13/04 703/7 |
| 2008/0178600 A1* | 7/2008 | Healy | F02C 9/00 60/773 |
| 2010/0027603 A1* | 2/2010 | Beadle | G01S 5/0294 375/226 |
| 2010/0257838 A1 | 10/2010 | Mazzaro et al. | |
| 2011/0106680 A1 | 5/2011 | Vittal et al. | |
| 2013/0024179 A1 | 1/2013 | Mazzaro et al. | |
| 2013/0066615 A1 | 3/2013 | Morgan et al. | |
| 2014/0214214 A1* | 7/2014 | Asmus | F24F 11/001 700/276 |
| 2015/0267619 A1* | 9/2015 | Khalid | B64C 11/305 701/100 |
| 2017/0030216 A1* | 2/2017 | Furukawa | F01D 25/00 |
| 2017/0370790 A1* | 12/2017 | Hettler | G01L 5/133 |

OTHER PUBLICATIONS

S J et al., "Unscented filtering and nonlinear estimation", Proceedings of the IEEE, vol. 92, Issue: 3, pp. 401-422, Mar. 2004.

Patrick Thomas Weber, "Modeling Gas Turbine Engine Performance at Part-Load", Electric Power Research Institute Southwest Research Institute University of Wyoming, pp. 13, May 2011-Jul. 2011.

Habudin Hassan, "Estimating Gas Turbine Performance", GTS-111D: GE Power Systems., pp. 15, Nov. 29, 2012.

Rainer Kurtz, "Gas Turbine Performance", Proceedings of the thirty-fourth turbo machinery symposium, pp. 146, 2005.

Khosravy-El-Hossani et al., "Improvement of Gas Turbine Performance Test in Combine Cycle", World Academy of Science, Engineering and Technology, Issue 34, p. 383, Oct. 2009.

Frank J Brooks, "Gas turbine Performance characteristics", GE Power Systems, GER 3567H, pp. 16, 2000.

Juha Kaikko, "Performance prediction of gas turbines by solving a system of non-linear equations", Thesis at Lappeenranta University of Technology, Lappeenranta, Finland (ISBN 951-764-142-7, ISSN 0356-8210), pp. 91, 1998.

R E Kalman, "A New Approach to Linear Filtering and Prediction Problems", Transactions of the ASME—Journal of Basic Engineering, 82 (Series D): 35-45, 1960.

Daum F et al, "Nonlinear filters: beyond the Kalman filter", Aerospace and Electronic Systems Magazine, IEEE, vol. 20, Issue: 8, pp. 57-69, Aug. 2005.

Blanchard et al, "Parameter estimation method using an extended Kalman Filter", Proceedings of the Joint North America, Asia-Pacific ISTVS Conference and Annual Meeting of Japanese Society for Terramechanics, Fairbanks, Alaska, USA, pp. 14, Jun. 23-26, 2007.

* cited by examiner

MODEL-BASED PERFORMANCE ESTIMATION

BACKGROUND

The subject matter disclosed herein generally relates to turbine engines, and more specifically, to performance correction in turbine engines.

Turbine engines generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases flow against and around turbine blades of the turbine, thereby driving rotation of the turbine and any external load. The external load may include an electrical generator.

When monitoring the operation of the turbine engine, ambient temperature fluctuations may cause fluctuations in measured performance of the turbine engine. Furthermore, filtering the performance using traditional filters does not remove the variation. Since true turbine health should be determined at a consistent ambient temperature, the traditional filtering techniques may not reflect true health of the machine.

BRIEF DESCRIPTION

In one embodiment, a controller includes a processor and memory. The memory stores instructions that, when executed, are configured to cause the processor to receive measurements pertaining to a measured operation parameter of at least a portion of a turbine system. The instructions are also configured to cause the processor to generate a customized model for the at least the portion of the turbine system. Moreover, the instructions are configured to cause the processor to estimate an estimated value using the received measurements. The estimated value pertains to a parameter of the turbine system. Furthermore, the instructions are configured to cause the processor to using the customized model, reduce or remove at least some environmental conditions from a corrected estimated value derived from the estimated value. The corrected estimated value may be used to assess health of the at least the portion of the turbine system and, upon detection of a health condition requiring an adjustment of the turbine system, generate a turbine system adjustment command.

In another embodiment, a method includes receiving measurements pertaining to a measured operation parameter of at least a portion of a turbine system. The method also includes generating a customized model for the at least the portion of the turbine system. Moreover, the method includes generating an estimated value using the received measurements. The estimated value pertains to a parameter of the turbine system. The method also includes determining whether the customized model is accurate. Furthermore, the method includes, if the customized model for the at least the portion of the turbine system is accurate, using the customized model, reduce or remove at least some environmental conditions from a corrected estimated value derived from the estimated value.

In another embodiment, a non-transitory, computer-readable medium stores instructions therein, which when executed, are configured to cause a processor to receive measurements pertaining to a measured operation parameter of a portion of a turbine system. The instructions are also configured to cause the processor to generate a customized model for the portion of the turbine system. The instructions are configured to cause the processor to generate an estimated value using the received measurements. The estimated value pertains to a parameter of the turbine system. The instructions are configured to cause the processor to reduce or remove, using the customized model, at least some environmental conditions from a corrected estimated value derived from the estimated value. Furthermore, the instructions are configured to cause the processor to cause display of the corrected estimated value.

In another embodiment, an automatic filter tuning method is executed to an enhanced customized model for accurate performance estimation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

This disclosure relates to a system and method for performance correction of an aero-derivative gas turbine in terms of improved accuracy of estimated power and heat rate. Specifically, the component level (turbine, compressor and combustor) efficiencies are estimated and used for estimating the corrected projected power as well as for degradation monitoring of the gas turbine.

Figure 1:
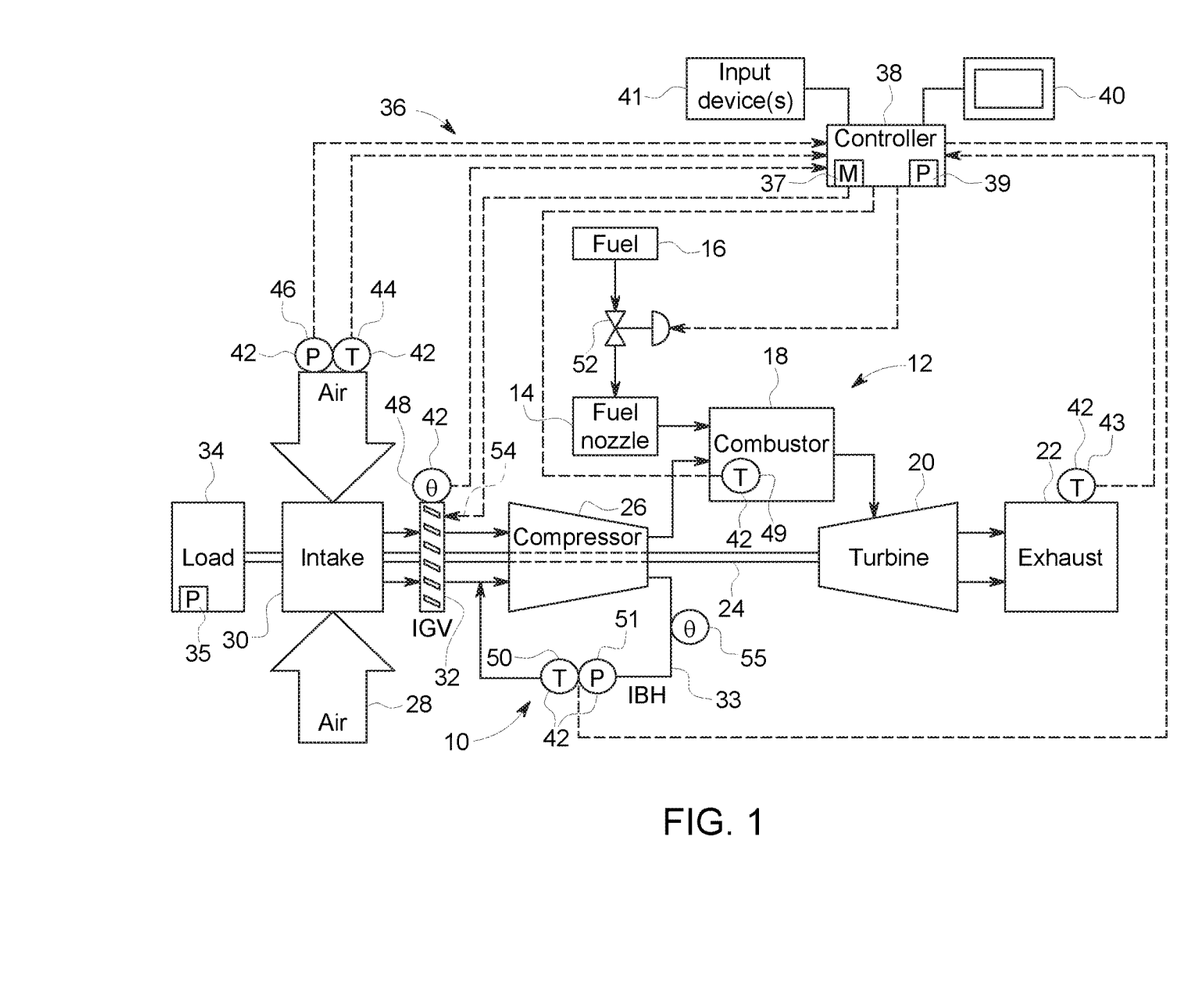
FIG. 1 illustrates a block diagram view of an embodiment of a turbine system.

FIG. 1 illustrates a block diagram of an embodiment of a turbine system 10 (e.g., turbomachinery) having a turbine engine 12. In some embodiments, the turbine system 10 may include a gas turbine, a steam turbine, a hydroturbine, and/or other similar turbine systems. As discussed below, the system 10 includes a control system 36 configured to monitor and control aspects of the turbine engine 12 to achieve multiple objectives, counter degradation/performance loss, and/or specifically maintain desired load output, heat rate, and/or various other outputs in response to monitored feedback. The turbine system 10 may use liquid or gaseous fuel, such as natural gas and/or a synthetic gas (e.g., syngas), to drive the turbine system 10. As depicted, in some embodiments, one or more fuel nozzles 14 may intake a fuel supply 16. Each fuel nozzle 14 then mixes the fuel with an oxidant (e.g., air) and may distribute the fuel-air mixture into a combustor 18. In certain embodiments, the fuel from the fuel supply 16 may be mixed with air prior to injection into the turbine system 10 (e.g., pre-mixed fuel). Multiple combustors 18 may be arranged circumferentially about the turbine engine 12. Further mixing occurs between the fuel and air within the combustors 18. Although shown schematically as being outside or separate from the combustors 18, the fuel nozzles 14 may be disposed inside the combustors 18. The fuel-air mixture combusts in a chamber within the combustors 18, thereby creating hot, pressurized combustion gases. The combustors 18 direct the combustion gases through a turbine 20 and toward an exhaust outlet 22. As the combustion gases pass through the turbine 20, the gases force blades within the turbine 20 to rotate a shaft 24 along a longitudinal axis of the turbine system 10. The turbine system 10 may optionally include an intercooler that cools air within the turbine system 10 before passing into another portion of the turbine system 10.

As illustrated, the shaft 24 is connected to various components of the turbine system 10, including a compressor 26. The compressor 26 also includes compressor blades coupled to the shaft 24. As the shaft 24 rotates, the compressor blades within the compressor 26 also rotate, thereby compressing air 28 from an air intake 30. The air intake 30 may feed the air 28 through a series of inlet guide vanes (IGVs) 32, which control the amount of air 28 that is conveyed into the compressor 26. In some embodiments, the air 28 may include a pre-mixed fuel, nitrogen, ambient air, other suitable fluids, or a combination thereof. The IGVs 32 may be disposed at an angle that can be increased or decreased to allow less or more air 28 into the compressor 26. Additionally, the turbine system 10 may include an adjustable Inlet Bleed Heat (IBH) channel 33 that may be used to redirect a portion of the compressed air from an outlet of the compressor 26 and/or exhaust 22 to the inlet of the compressor 26. In certain embodiments, this redirected air may be somewhat warmer than ambient air taken in at the compressor 26.

Accordingly, the redirected air may heat the ambient air and cause the air to expand thereby reducing an amount of air flowing through the system and enabling the turbine system 10 to operate at a part load with or without the assistance of an IGV 32 angle change. Additionally, in some embodiments using pre-mixed fuel, the IBH channel 33 may be used to dilute a concentration of fuel in the air 28. The shaft 24 may also be coupled to a load 34, which may be a vehicle or a stationary load, such as an electrical generator in a power plant or a propeller on an aircraft, for example.

The load 34 may include any suitable device capable of being powered by the rotational output of turbine system 10. Furthermore, although the load 34 is illustrated adjacent to the intake, the load 34 may be located at any location connected to the shaft 24 either directly or indirectly (e.g., via gears).

Moreover, the load 34 may also include a power sensor 35. For instance, if the load 34 is an electric generator, the generated electric power may be measured as an output that indirectly indicates horsepower of the turbine system 10. Additionally or alternatively, torque sensors may be used to measure torque to determine horsepower. These horsepower measurements may be used to determine efficiency of the turbine system 10.

The control system 36 may be used to control operation of the turbine engine 12 to increase the operating efficiency or vary output power of the turbine system 10. For example, the control system 36 may be used to monitor and adjust various parameters of the turbine engine 12. The control system 38 may also communicate with multiple sensors 42 to monitor aspects of the turbine engine 12. In certain embodiments, the control system 36 may include an industrial controller 38. Although the industrial controller 38 is illustrated with single blocks for memory block 37 and a processor 39 for purposes of example, in some embodiments as a double or triple redundant controller with 2, 3, or more processors 39 may be used, and multiple processors and/or memories may be situated within either the same or different units. The processors 39 may include general-purpose or application-specific microprocessors, for example.

Particularly, in some embodiments, the controller 38 may include any suitable computing device, such as a desktop computer or server. Likewise, the memory 37 may include volatile and/or non-volatile memory, random access memory (RAM), read only memory (ROM), flash memory, hard disk drives (HDD), removable disk drives and/or removable disks (e.g., CDs, DVDs, BluRay disks, USB pen drives, etc.), or any combination thereof. Additionally, in certain embodiments, the turbine system 10 may include a display 40. In some embodiments, the display 40 may be integrated into (e.g., mobile device screen) or separate from (e.g., distinct monitor display) the controller 38. As discussed below, the display 40 may be used to present information to a user that enables the user to select various objectives using a graphical user interface. Additionally, the turbine system 10 may include one or more input devices 41 that receive selections of choices from one or more users. In certain embodiments, the input devices 41 may include mice, keyboards, touch screens, trackpads, or other input devices suitable for receiving inputs to the controller 38.

Regardless of the specific components, instructions stored on the memory 37 may be designed to carry out various monitoring, analysis, display menu functions, and control functions of the disclosed embodiments. In the depicted embodiment, the controller 38 may interact with the sensors 42, which include an exhaust temperature sensor 43, an ambient air temperature sensor 44, an ambient air pressure sensor 46, an IGV angle sensor 48, a firing temperature sensor 49, an IBH temperature sensor 50, and/or an IBH air flow sensor 51. Instead of sensors, models may be used to estimate measurable quantities based on one or more sensor inputs. Further, the controller 38 may interact with an actuated valve 52 an IGV actuator 54, an IBH actuator 55, and/or other actuators to adjust operation of the turbine engine 12, as described in detail below.

In addition to sensor measurements of the sensors 42, the controller 38 may use a model stored in memory 37. The model may be used to estimate or calculate values for parameters that are not directly measureable or are not easily measureable. For instance, the model may estimate a speed of the compressor 26, one or more temperatures in or around the compressor 26, one or more compressor 26 pressures, a temperature of the turbine 20, a pressure at the turbine 20, or other similar parameters of portions of the turbine system 10. This model may also be used to track degradation of the various components of the turbine system 10.

Figure 2:
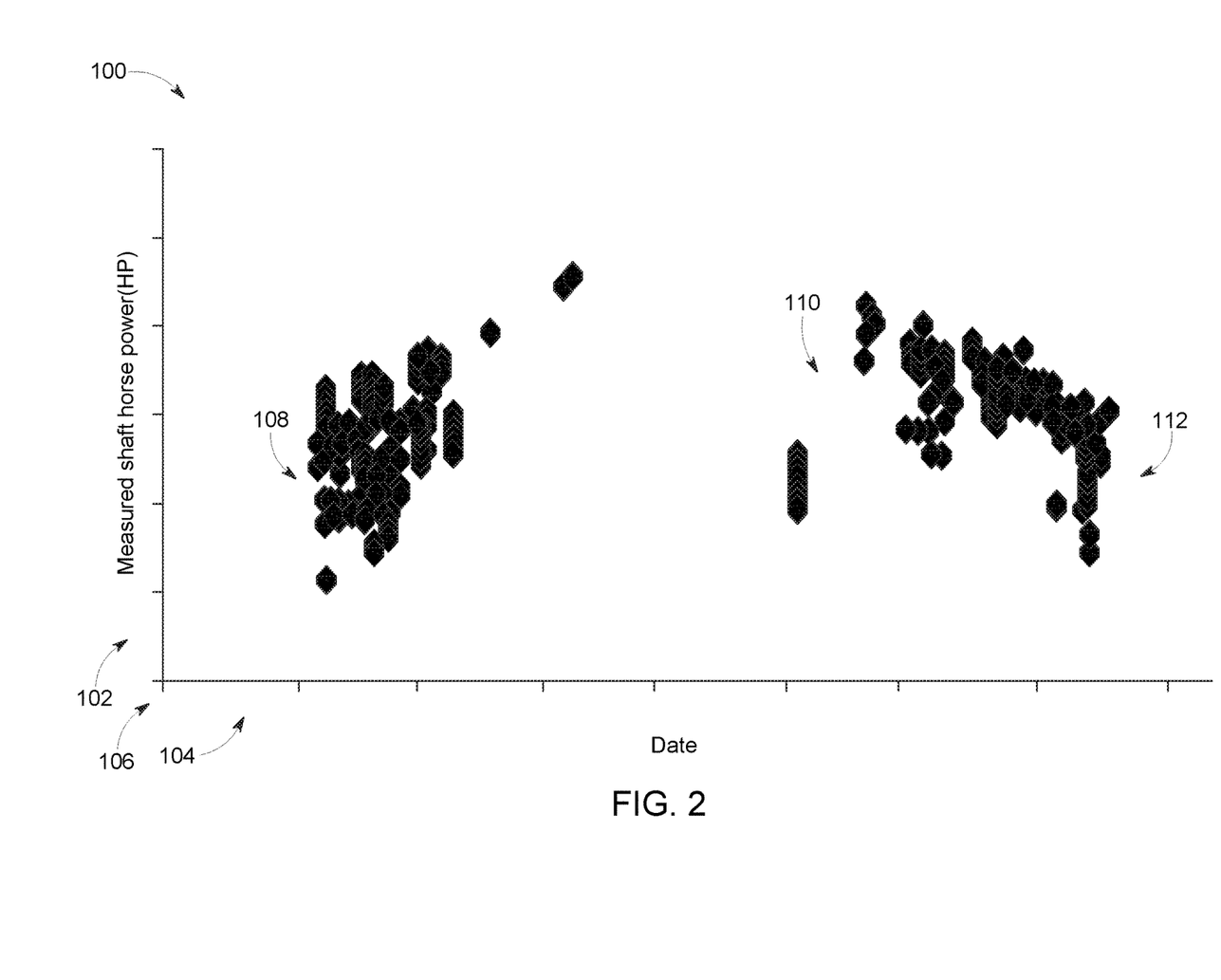
FIG. 2 is a graphical view of unfiltered power measurements for the turbine system of FIG. 1.

The performance, such as the output power at the load 34 as measured by the power sensor 35, of the turbine system 10 varies with ambient temperature, ambient pressure, and ambient humidity fluctuations. Due to these variations, it may be difficult to determine the health of a turbine system 10 since the output power alone may vary based on the various ambient conditions of the environment in which the turbine system 10 is located. For example, in some scenarios, as the ambient temperature increases around a turbine system 10, the turbine system 10 decreases in efficiency. Furthermore, such fluctuations may interfere with proper interpretation of data logs of the efficiency measurements for the turbine system. For example, FIG. 2 shows an embodiment of a graph 100 of horsepower measurements over time. As illustrated, the graph 100 includes an abscissa 102 that corresponds to horsepower measured at the shaft 24 either directly or indirectly. The graph 100 also includes an ordinate 104 that corresponds to measurements of time. For example, the ordinate may include interval markings 106 corresponding to minutes, hours, days, weeks, months, years, or another suitable interval (e.g., 50 or 100 days). As illustrated, the graph 100 includes anomalies 108, 110, and 112 that may correspond to fluctuations in power attributable to worn parts, inefficiencies of various components of the turbine system, variations of the environment around the turbine system 10.

Figure 3:
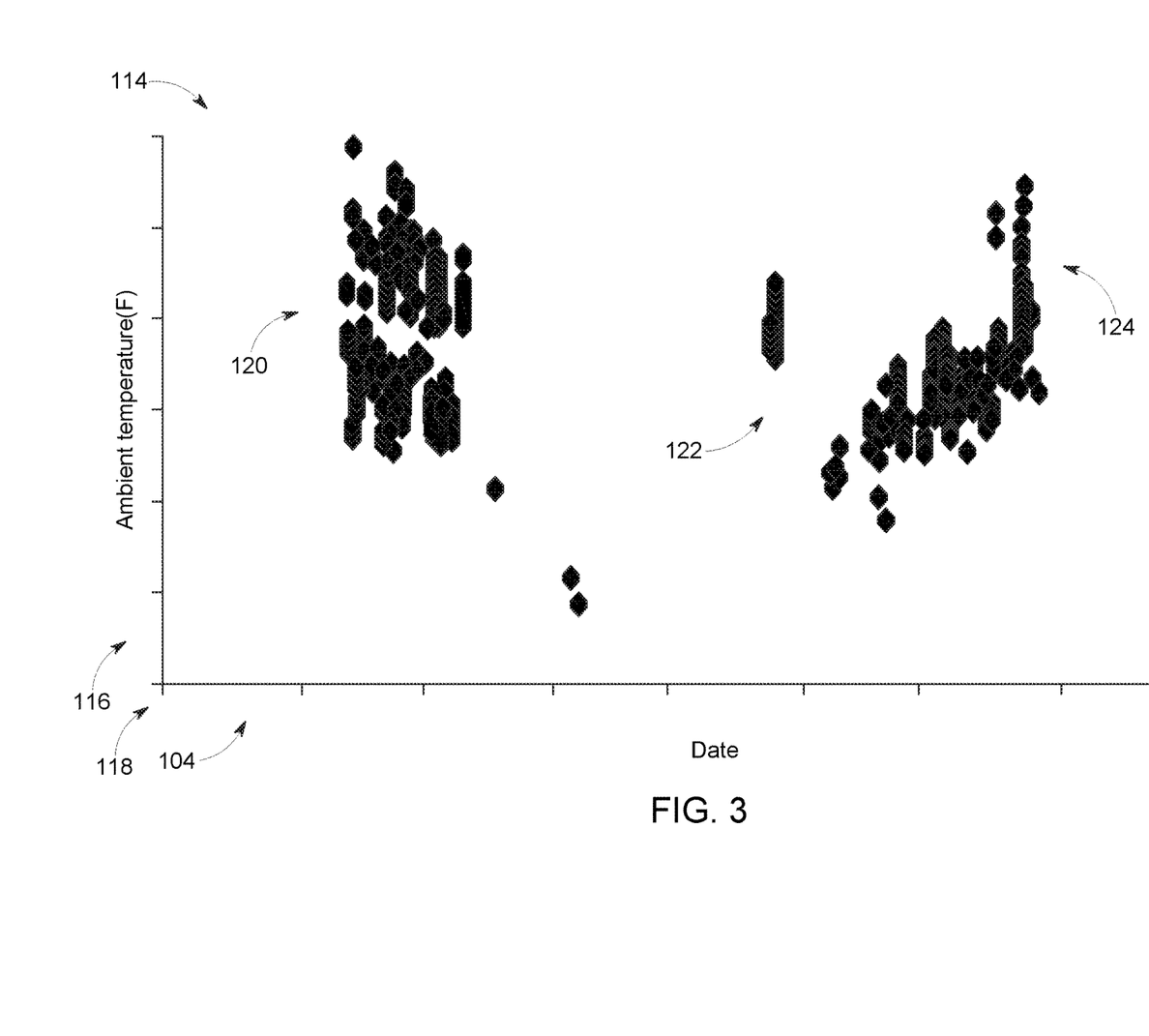
FIG. 3 is a graphical view of ambient temperature measurements that correspond to the unfiltered power measurements of FIG. 2.
Figure 4:
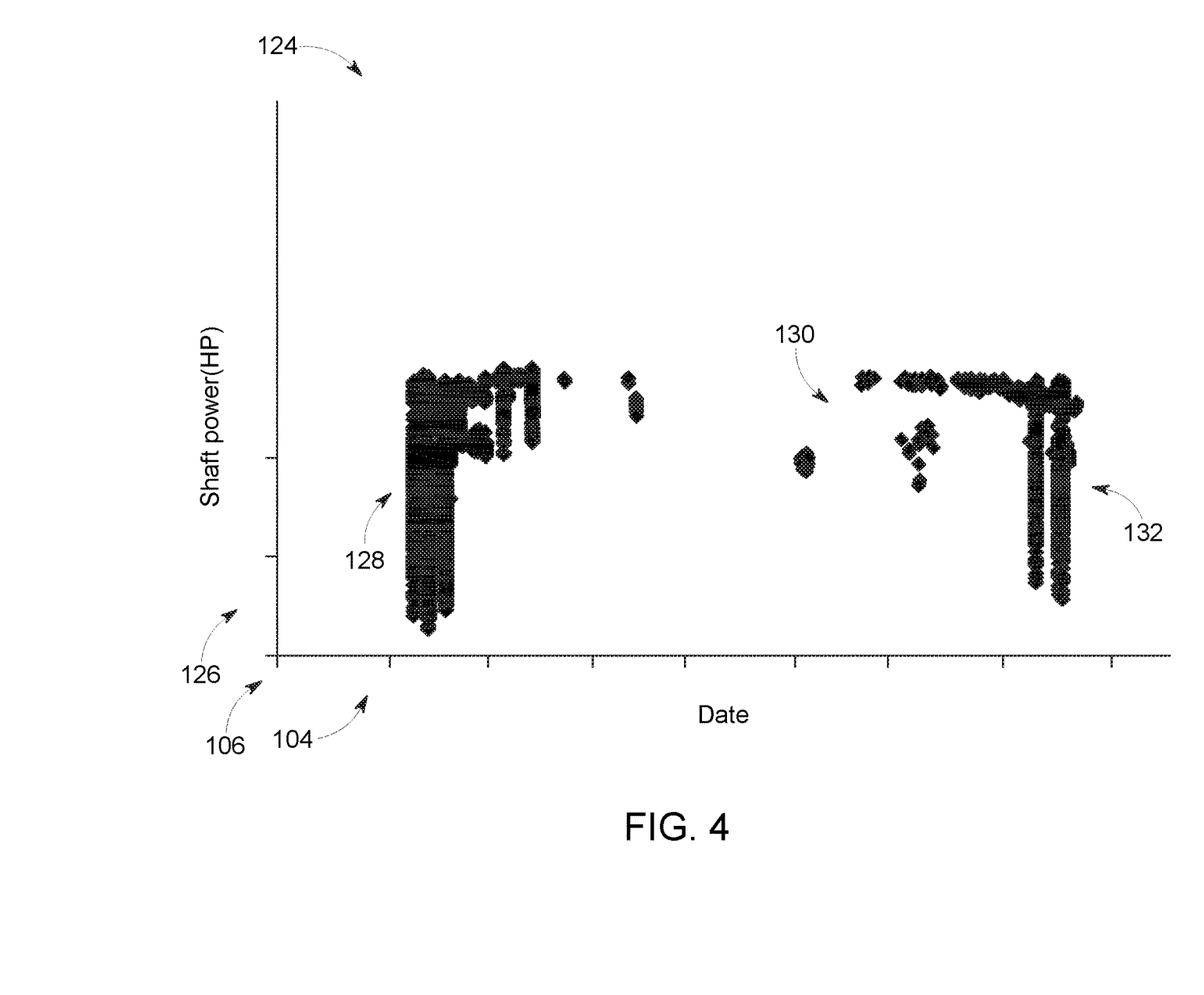
FIG. 4 is a graphical view of filtered power measurements for the turbine system of FIG. 1, using a generic model.

FIG. 3 illustrates an embodiment of a graph 114 of a temperature log for the same period of time as FIG. 2. The graph 114 instead includes an ordinate 116 corresponding to ambient temperatures for that period of time. As illustrated, the ambient temperature fluctuations at points 120, 122, and 124 that correspond to the anomalies 108, 110, and 112. Thus, at least some amount of the anomalies 120, 122, and 124 are attributable to temperature fluctuations, but even comparing graph 100 and 114, it may difficult to determine how attributable the anomalies are to temperature fluctuations and how attributable the anomalies are to other factors (e.g., inefficiencies, worn or broken parts, etc.). To try to achieve this, filtering may be applied to the horsepower measurements of FIG. 2 using the various measurements from the sensors. However, general filters may be unable to properly differentiate between hardware issues and ambient temperature fluctuations. For example, FIG. 4 illustrates an embodiment of a graph 124 that illustrates a filter corrected version of graph 100. The graph 124 pertains to the same period of time as graph 100. The graph 124 also includes an ordinate 126 that includes filtered (e.g., error corrected) horsepower measurements. However, as illustrated, the anomalies 108, 110, and 112 appear in the graph 124 as filtered anomalies 128, 130, and 132 that appear to include and/or be wholly attributable to the ambient fluctuations. Thus, the general filtering process, illustrated in FIG. 4, has not clarified the anomalies with respect to ambient temperature.

Figure 5:
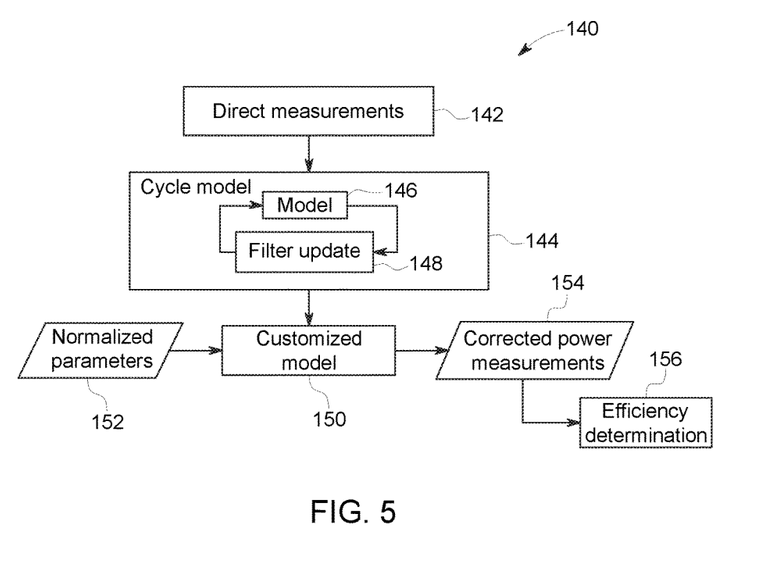
FIG. 5 is a schematic view of custom model generation and application for the turbine system of FIG. 1.

In accordance with an embodiment disclosed herein, the filtering process may include a customized model that is able to normalize performance measurements to differentiate between fluctuations of performance attributable to ambient conditions and inefficient performance. The approach in this disclosure may improve the signal-to-noise ratio by three times and results in a deployment time reduction of approximately 50 times over systems that (1) estimate gas turbine performance using thermodynamic equations and manually balancing mass flow and energy conservation or (2) estimate performance using a model based approach where the nonlinear model is linearized around the operating point (i.e., Extended Kalman Filter). FIG. 5 illustrates a block diagram of a customized model implementation 140. Gas turbine field data (e.g., direct measurements) 142 from the sensors 42 and selected steady state baseload operation data 143 are passed to a filter 144. The filter 144 includes cycle model fluid dynamic and thermodynamic relations used as mathematical representation of the field data derived using direct measurements 142. The filter 144 includes a model 146 and an updating filter module 148. The model 146 may be used to estimate measurable quantities based on the direct measurements 142 for other parameters. For example, the model 146 may be used to estimate parameters, such as component level flows and efficiencies, pertaining to the turbine system 10 from the direct measurements 142 parameters. The prediction equation and measurement equations used are given below.

Prediction Equation $x_k = x_{k-1}$, $x_k$ are states at k th instant, which represent gas turbine model parameters.

Measurement Equation $y_k = \text{CycleDeck}(x_k, u_k)$ where Cycledeck is the thermodynamic model of gas turbine.

$y_k$ are the outputs of gas turbine and $u_k$ are inputs

In some embodiments, components of the model 146 may be stored in the memory 37 and/or memory remote from the controller 38 and/or executed by the processor 39. In certain embodiments, the model 146 may include a turbomachinery degradation model that models degradation of various components of the turbine system 10, such as estimating components/part life online in real time. In some embodiments, the model 146 may be physics-based model based at least in part on the total online time (e.g., overall time of operation) of the turbine system 10 that models a loss of efficiency that occurs from an amount of tracked online time. In certain embodiments, this tracked online time may be reset upon maintenance of the turbine system 10. Additionally, in some embodiments with a physics-based model, modeling may be based at least in part on various operating parameters (e.g., IGV angles) of the turbine system 10. In certain embodiments, the model 146 may include an empirical model with expected responses from various measured parameters (e.g., IGV angles) and operating conditions (e.g., ambient temperature, online time). In other embodiments, the model 146 may include one or more AI modules (e.g., expert system models), heuristic models, or other suitable models that may be used to simulate the effects on a model overtime as well as other various operating conditions and control parameters.

In some embodiments, the model 146 may include a degradation model that is adapted based on measured inputs (e.g., firing temperature, etc.) Such that the model 146 emulates one or more portions of the turbine system 10 under measured conditions. Moreover, certain embodiments of the model 146 may be used to estimate a current state of degradation and/or predict a required adjustment to maintain a target parameter. For example, the model 146 may estimate a current state of degradation for at least one component of the turbine system 10 based on a number of "fired hours" for the at least one component. In other words, the model 146 may estimate the degradation of the component based on previous use of the component. In certain embodiments where the model 146 is used to predict a required adjustment to maintain a target parameter, the model 146 may track the efficiency of at least one component of the turbine system 10 (e.g., compressor 26) and determine what adjustment needs to be made to maintain the output of the at least one component.

The filter 144 is used to perform a filter update 148 on the model 146 for estimating component parameters. The filter update 148 is a robust filter-based update of model parameters including component flows and efficiencies. The filter 144 is also used to form a customized model 150 based on the direct measurements 142, the model 146, past filtered results, and filter predictions. The filter 144 may include any Bayesian filter, such as a linear Kalman filter, extended Kalman filter, unscented Kalman filter, a particle filter or any other suitable filter to make such updates. In some embodiments, the filter update 148 may be iterative or non-iterative. The filter 144 can include unit specific thresholds for picking the appropriate process noise covariance matrix (Q matrix) and for resetting the current state error covariance to the known initial state error covariance. Thus, the filter 144 is used to provide a customized and updated model 150 for the turbine engine 10.

The customized model 150 receives standard parameters 152 that may indicate some conditions at which calculations are to be made to provide a base for which to properly compare performance between turbine efficiency and operation between different turbines and/or different times. For example, the standard parameters 152 may include an ISO condition of 59° F., 1 atmospheric pressure, and 60% humidity or some other reference condition. The standard parameters 152 are input to the customized model 150 to estimate corrected power measurements 154 if the turbine system 10 is operated under the standard parameters 152. The resulting corrected power measurements 154 are then analyzed to determine whether a corrected performance is acceptable (block 156). For example, the performance of the gas turbine may be unacceptable by an efficiency below a threshold level. Alternatively, the performance of the filter may be examined by comparing the corrected performance to actual performance versus conditions. If the filter has not corrected the performance accurately enough, the filter is modified (block 159). For example, process noise co-variance and adjusting a normalized threshold for resetting error covariance to adjust the filter 144.

Figure 6:
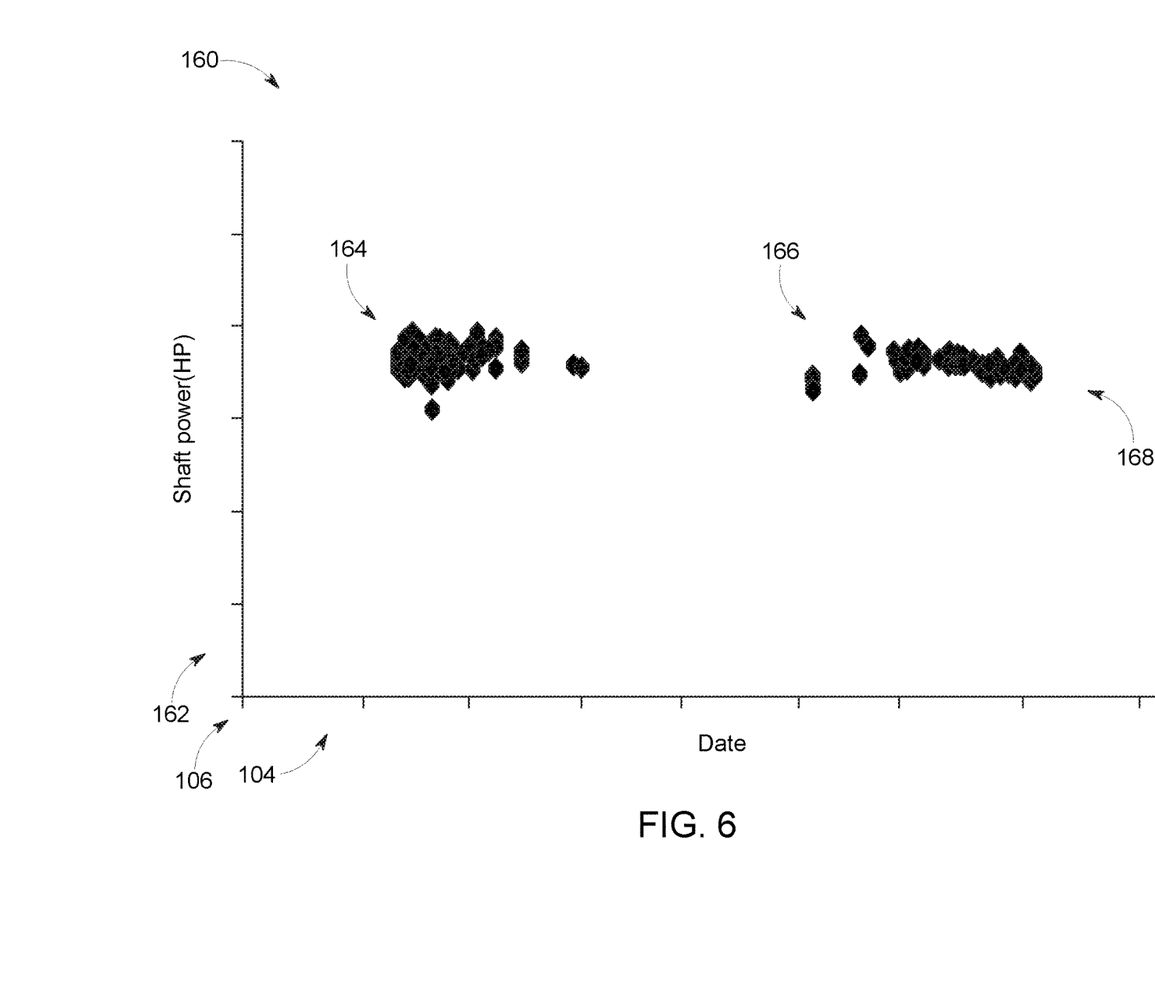
FIG. 6 is a graphical view of filtered power measurements for the turbine system of FIG. 1 using the custom model of FIG. 5.

For example, FIG. 6 illustrates a graph 160 of corrected power measurements 154 on an ordinate 162 corresponding to horsepower of the shaft 24. As illustrated, the graph 160 shows that the anomaly 108 has been filtered to where the variation 164 in shaft power has been substantially filtered to remove atmospheric effects on efficiency. Thus, using the customized model 150 and the corrected power measurements 154, the anomaly 108 has been manipulated into the variation 164 that appears considerably less dramatic than the anomaly 108 that was also subject to atmospheric conditions (e.g., temperature, pressure, and humidity). By substantially reducing or eliminating effects from the atmospheric conditions on the efficiency measurements for the turbine system 10, the condition of the monitored components of the turbine system 10 may be focused on without extraneous information influencing the analysis. Furthermore, although the graph 160 pertains to power measurements based on rotation of the shaft 24, the aforementioned methodologies may be applied to any measurements (e.g., compressor temperatures, compressor pressures, etc.) in the turbine system 10 that may be effected by outside conditions (e.g., ambient temperature, pressure, or humidity).

Similar to variation 164, variation 166 reflects a variation in shaft power corresponding to the anomaly 110 with atmospheric effects reduced or eliminated therefrom. As illustrated, the variation 166 corresponds to a substantial change in power even after the atmospheric effects have been reduced or eliminated in the graph 160. Thus, the variation 168 can be at least partially attributed to hardware (e.g., equipment change or maintenance). On the other hand, variation 168 has a relatively small change in power after atmospheric conditions have been reduced or eliminated. Thus, the variation 166 may be primarily attributed to hardware. In other words, when examining the corrected power measurements 154, a change in a measurement by a value greater than a threshold value, the change may be attributed to a hardware change (e.g., degraded parts, friction, maintenance, hardware replacements, etc) without a substantial likelihood that extraneous information has effected the corrected power measurements 154. These power measurements correctly reflect the performance of the gas turbine.

Moreover, in some embodiments, the graph 160 may be presented to a user for a user to determine whether the measured parameter has fluctuated based on hardware changes. Additionally or alternatively, the processor 39 may determine efficiency or health (e.g., degradation) of the turbine system 10 and/or the components thereof to create an efficiency determination 156 that reflects component or overall health of the turbine system 10, as represented in FIG. 5. Thus, the corrected power measurements 154 include accurate estimates for a specific condition due to a personalized and an updated model for the specific turbine engine 10. In some embodiments, the processor 39 may cause the display 40 to display an advisory notification of which fluctuations are likely to be attributable to hardware changes. For example, the processor 39 may cause likely hardware changes that include a variation greater than a threshold to be highlighted in the graph that they are presented. Additionally or alternatively, changes below the threshold may be drawn in a first color (e.g., blue), and changes above the threshold may be drawn in a second color (e.g., red).

Figure 7:
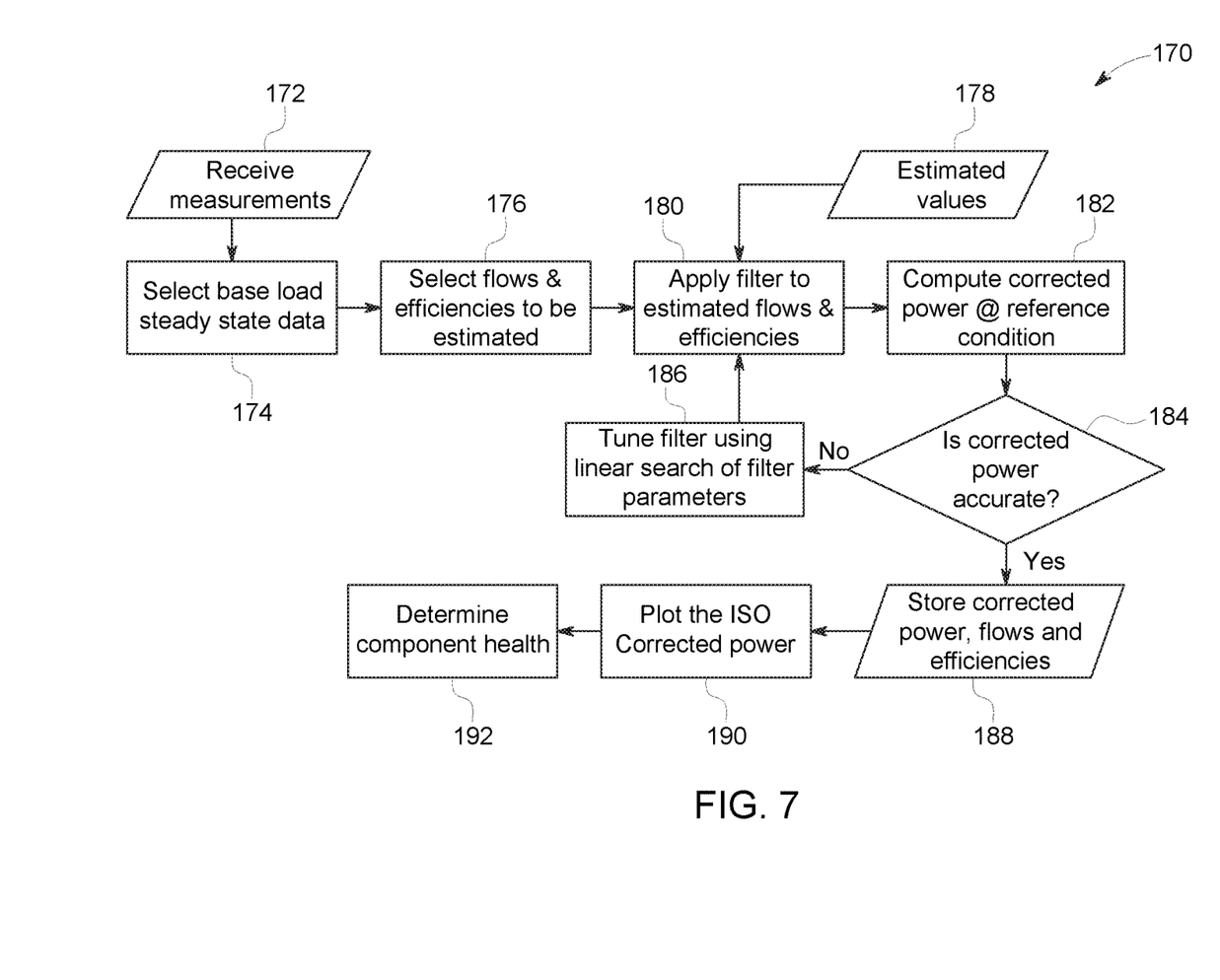
FIG. 7 is a flow chart diagram of a process for generating and applying the custom filter of FIG. 5.

FIG. 7 illustrates a process 170 which the controller 38 may use to determine efficiency of at least a portion of the turbine system 10. The controller 38 receives measurements from sensors 42 (block 172). The controller 38 then selects a base load and steady state data (block 174). In some embodiments, selecting the base load and steady state includes presenting base load and steady state data options and receiving a selection of the data. In some embodiments, this data may be selected based on the measurements, such that a base load is previously known and steady state data may be identified accordingly. The controller 38 also selects flows and efficiencies to be estimated (block 176). In some embodiments, such selections may include selections based on rules for evaluating each flow and efficiency based on operating parameters of the turbine system 10. Additionally or alternatively, selecting flows and efficiencies may include presenting and/or receiving a selection of flows or efficiencies to be estimated in the turbine system 10. The controller 38 generates or receives estimated values for the selected efficiencies and flows (block 178). These estimated values may be the first step in multiple levels of estimated values. Thus, this level of estimated values may be also referred to as intermediate estimated values herein. The controller 38 then applies a filter (e.g., the cycle model 144) to the estimated flows and efficiencies (block 180). Using the filter, the controller 38 computes a corrected power at a reference condition (block 182). In some embodiments, the reference condition may be a selectable condition that may be changed between different operations of the controller 38. The controller 38 then compares the corrected power determination to other filtering results to see if the corrected power determination is suitably accurate (block 184). If the corrected power is not yet accurate, the controller 38 tunes the filter using a linear search of filter parameters (block 186). If the corrected power is accurate, the controller 38 stores the corrected power, flows, and efficiencies (block 188). In some embodiments, the controller 38 plots the corrected power (block 190). Moreover, in certain embodiments, the controller 38 determines hardware health, component health, or overall health based on the corrected power measurements (block 192). If the controller determines that the health is such that an adjustment of the gas turbine system is required, the controller may then generate a turbine system adjustment command. For example, the controller may generate a repair or maintenance command depending upon degradation of a specific hardware or component. As a more specific example, if the efficiency of the compressor falls below certain value, water wash of the compressor may be commanded to retrieve the lost efficiency.

Technical effects of the invention include improved accuracy in power projection when compared against the non-personalized models that enables proper attribution of changes in parameters to the cause for the change through an improved signal-to-noise ratio. The personalized model also includes relatively quick execution times and model tuning capability for time. Furthermore, the personalized model provides improves data quality and data analytics that provides improved scalable condition based maintenance determinations. Since the data is more accurate, the personalized model enables more precise maintenance determinations to reduce unplanned outages due to increased accuracy in determining component deterioration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A controller for a turbine system comprising:
a processor; and
memory storing instructions that, when executed, are configured to cause the processor to:
receive direct measurements and selected state baseline operation data pertaining to a measured operation parameter of at least a portion of a turbine system;
estimate an estimated value using the received direct measurements and selected state baseline operation data, wherein the estimated value pertains to a parameter of the turbine system;
generate a customized model using the estimated value for the at least the portion of the turbine system;
compare the customized model with at least one normalized parameter to detect an anomaly based on at least one atmospheric condition, wherein atmospheric conditions include an ambient temperature, an ambient pressure, and an ambient humidity;
using the customized model, reduce or remove at least one atmospheric condition based on the detected anomaly from the estimated value to derive a corrected estimated value;
using the corrected estimated value, assess health of the at least the portion of the turbine system; and
if warranted in light of the assessed health, generate a turbine system adjustment command.

2. The controller of claim 1, wherein the estimated value comprises power for the turbine system.

3. The controller of claim 1, wherein the estimated value comprises an efficiency of a component of the turbine system wherein the component comprises:
a turbine of the turbine system;
a compressor of the turbine system; or
a combustor of the turbine system.

4. The controller of claim 1, wherein the instructions are configured to cause the processor to assess the health of the at least the portion of the turbine system by determining whether a change in the corrected estimated value exceeds a threshold or whether a value in the corrected estimated value varies from an expected value by a threshold.

5. The controller of claim 1, wherein the instructions are configured to cause the processor to determine an intermediate estimated value that pertains to a measurement of a parameter of the component, wherein the estimated value is generated using the intermediate estimated value.

6. The controller of claim 5, wherein the intermediate estimated value comprises:
a speed of the compressor;
a temperature in or around the compressor;
a compressor pressure;
a temperature of the turbine; or
a pressure at the turbine.

7. The controller of claim 1, wherein the instructions are configured to cause the processor to generate the customized model for the at least the portion of the turbine system by tuning a tunable filter to optimize parameters of the customized model.

8. The controller of claim 1, wherein the instructions are configured to cause the processor to:
determine whether the customized model is accurate; and
if the customized model is not accurate, tune the customized model accordingly to generate a better customized model.

9. A method comprising:
receiving direct measurements and selected state baseline operation data pertaining to a measured operation parameter of at least a portion of a turbine system;
generating an estimated value using the received direct measurements and selected state baseline operation data, wherein the estimated value pertains to a parameter of the turbine system
generating a customized model using the estimated value for the at least the portion of the turbine system;
determining whether the customized model is accurate, wherein the determining includes comparing the customized model with at least one normalized parameter to detect an anomaly based on at least one atmospheric condition, wherein atmospheric conditions include an ambient temperature, an ambient pressure, and an ambient humidity;
if the customized model for the at least the portion of the turbine system is accurate, using the customized model, reduce or remove at least one atmospheric condition based on the detected anomaly from the estimated value to derive a corrected estimated value;

using the corrected estimated value for assessing health of the at least the portion of the turbine system; and if warranted in light of the assessed health, generating a turbine system adjustment command.

10. The method of claim 9, wherein the estimated values comprise a power of the turbine system or an efficiency of a component of the turbine system.

11. The method of claim 9, further comprising tuning a tunable filter to optimize parameters of the customized model, wherein generating the customized model for the at least the portion of the turbine system comprises using the optimized parameters.

12. The method of claim 11, further comprising determining whether the tunable filter is accurate; and, if the tunable filter is not accurate, further tuning the tunable filter.

* * * * *